(12) United States Patent
Nishimura et al.

(10) Patent No.: US 6,389,344 B1
(45) Date of Patent: May 14, 2002

(54) AUTOMATIC HEADLIGHT AIMING DEVICE FOR A VEHICLE

(75) Inventors: Kenichi Nishimura, Gifu; Hiroaki Okuchi, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/803,354

(22) Filed: Mar. 12, 2001

(30) Foreign Application Priority Data

Mar. 13, 2000 (JP) ......................................... 2000-068033

(51) Int. Cl.[7] ............... B60Q 1/08; B60Q 1/10
(52) U.S. Cl. ............... 701/49; 701/36; 315/82; 362/460; 362/466
(58) Field of Search ....................... 701/36, 49; 315/76, 315/77, 82; 362/459, 460, 464, 466

(56) References Cited

U.S. PATENT DOCUMENTS

| 5,331,251 A | * | 7/1994 | Marois | ................... | 315/82 |
| 5,896,011 A | * | 4/1999 | Zillgitt | .................. | 315/82 |
| 6,193,398 B1 | * | 2/2001 | Okuchi et al. | ............... | 362/466 |
| 6,234,654 B1 | * | 5/2001 | Okuchi et al. | ............... | 362/466 |

FOREIGN PATENT DOCUMENTS

| DE | 4005812 | 4/1991 |
| DE | 4338281 | 5/1995 |
| EP | 0582735 | 2/1994 |
| EP | 0825063 | 2/1998 |
| JP | 10-230777 | 9/1998 |

OTHER PUBLICATIONS

Patent Abstracts of Japan, vol. 2000, No. 11, Jan. 3, 2001 (Jan. 3, 2001) & JP 2000 225887 A (Toyota Motor Corp), Aug. 15, 2000.

* cited by examiner

*Primary Examiner*—Yonel Beaulieu
(74) *Attorney, Agent, or Firm*—Nixon & Vanderhye P.C.

(57) ABSTRACT

The rear vehicle height HR is detected by the vehicle height sensor as vehicle inclination information by a CPU. Based on the rear vehicle height HR, the inclination angle of the headlight optical axis direction is computed with an inherent control constant corresponding to vehicle specifications preset by a specification discrimination signal. Then, the headlight optical axis direction is adjusted with reference to the pitch angle.

9 Claims, 3 Drawing Sheets

|  | SPEC 1 | SPEC 2 | SPEC 3 | SPEC 4 |
|---|---|---|---|---|
| SIGNAL LINE 1 | SHORT | SHORT | OPEN | OPEN |
| SIGNAL LINE 2 | SHORT | OPEN | SHORT | OPEN |

AUTOMATIC HEADLIGHT AIMING DEVICE FOR A VEHICLE

CROSS-REFERENCE TO RELATED APPLICATION

The present invention is related to Japanese patent application No. 2000-68033, filed Mar. 13, 2000; the contents of which are incorporated herein by reference.

FIELD OF THE INVENTION

The present invention relates to an automatic headlight aiming device, and more particularly to an automatic headlight aiming device for a vehicle that automatically adjusts the direction of the optical axis of headlights mounted on a vehicle.

BACKGROUND OF THE INVENTION

Presently, in a vehicle headlight, if the direction of the optical axis is directed upward when vehicle is inclined due to hills or other reasons, drivers of on-coming cars will be blinded. Or, if the direction of the optical axis is directed downward, the drivers' visual recognition of distance is adversely affected. Therefore, there is a demand for keeping the optical axis of headlights in a fixed direction.

A result of computation of the inclination angle of the headlight optical axis with respect to the horizontal plane will sometimes vary with vehicle specifications. A situation is considered where only one vehicle height sensor, giving vehicle inclination information, detects vehicle height variation. Here, control constants vary with vehicle height sensor location. Specifically, sensors positioned on the front wheel side or rear wheel side of the driver's or front passenger's seat, may result in a different computed vehicle inclination angle and consequently in an improperly adjusted headlight optical axis direction.

To obviate such a drawback, it is necessary to use an ECU (electronic control unit) set to specific control constants conformable to the vehicle's specifications. To meet this need, a plurality of ECU's with different control constants are installed. However, since the ECUs have the same external appearance in spite of different product numbers, the wrong combination of the vehicle's specifications and the ECU's may be combined.

In addition, in the conventional device the optical headlight axis direction is controlled by changing the control constant according to a change in a vehicle occupants' seating condition. If the control constant is frequently changed, the headlight optical axis direction will largely and unstably move the headlight optical axis.

Also, In JP-A-10-230777, using one vehicle height sensor and a seating sensor mounted on the front passenger's seat, the vehicle inclination angle is estimated and the inclination angle of the headlights is changed. Since an ON/OFF signal from the seating sensor frequently varies with change in the occupant's seating posture, the headlight aim will be frequently switched and unstably shifted according to the signal. Drives of other vehicles may mistake this for headlight flashing or a warning or a signal.

SUMMARY OF THE INVENTION

Therefore, the present invention provides an automatic headlight aiming device that properly adjusts the headlight optical axis direction with seating change by adopting common ECU's despite a difference in vehicle specifications.

In a first aspect of the invention, the headlight optical axis inclination angle with respect to the horizontal plane is computed by an inclination angle computing means using inherent control constants according to inclination information detected by the inclination information detecting means. The control constants are set by the control constant setting means according to a specification discrimination signal which expresses a difference between various specifications of a vehicle. Thus the headlight optical axis direction is adjusted by the optical axis adjusting means based on the inclination angle.

In another aspect, the control constant is set by the control constant setting means, according to an evaluation signal, only once after vehicle installation. Therefore, the control constant once set in conformity to vehicle specifications will not improperly change due to noise or other reasons.

In another aspect of the invention, the headlight optical axis inclination with respect to the horizontal plane is computed by the inclination angle computing means based on an inclination information fed from the to inclination information detecting means. A vehicle occupant's seating condition is detected by the seating condition detecting means. The response of the optical axis headlight adjustment by the optical axis adjusting means will change according to a result of seating condition detection or timing to start the optical axis adjustment will be delayed for a predetermined period of time. Therefore, it is possible to control a substantial change or unstable movement of the headlight optical axis direction if the vehicle occupants' detected seating condition varies frequently.

In another aspect, the detection result is fed from the seating condition detecting means during a vehicle driving is fixed. Unstable adjustment or control of the headlight optical axis is prevented that is likely to occur when the seating condition detecting means is ignored.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE INVENTION

Embodiments of an automatic headlight aiming device for a vehicle according to this invention will be described with reference to the accompanying drawings.

Figure 1:
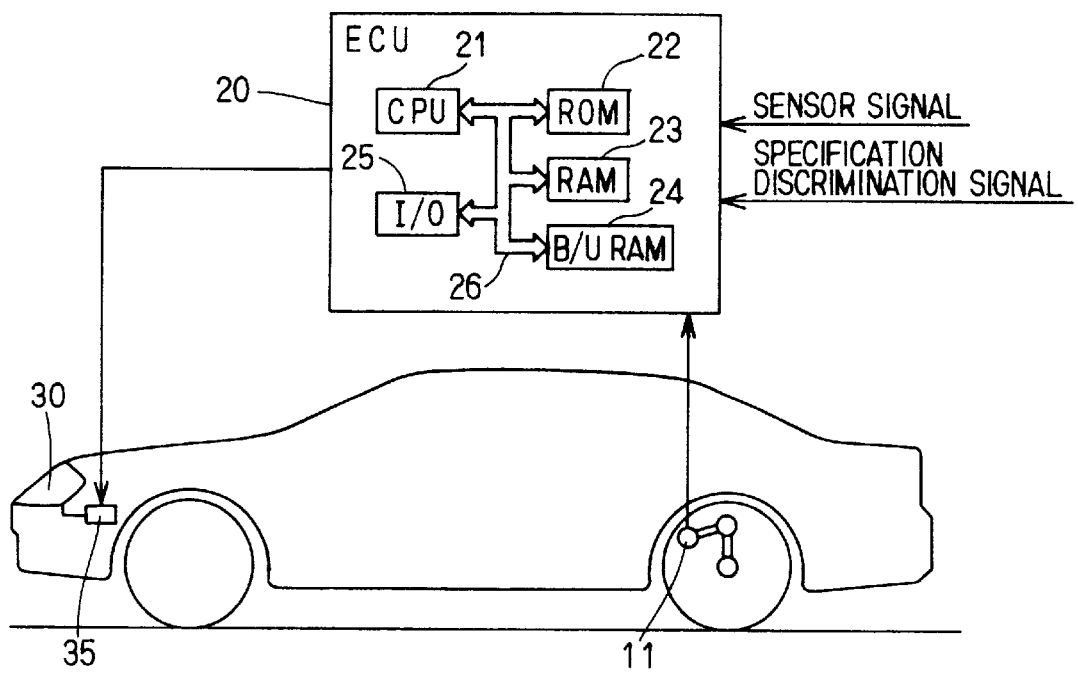
FIG. 1 A schematic view showing of an automat headlight aiming device for a vehicle according to the invention.

FIG. 1 is a schematic view showing the general configuration of the automatic headlight aiming device according to one embodiment of this invention.

In FIG. 1, a vehicle height sensor 11 is mounted on the rear wheel axle either on the driver's or front passenger's seat side of the vehicle. From the vehicle height sensor 11, the amount of relative displacement between the rear wheel axle and the vehicle body, that is, the rear vehicle height (the amount of displacement of the vehicle height on the rear wheel side) HR as the amount of displacement of the vehicle height, is input to an ECU 20. Furthermore, signals from other sensors (not shown) and a later-described specification discrimination signal for the automatic discrimination of vehicle specifications are also supplied to the ECU 20. The ECU 20 is illustrated outside of the vehicle for the sake of convenience.

The ECU 20 is a logical operation circuit comprising a CPU 21 as a known central processing unit, a ROM 22 storing a control program, a RAM 23 storing various kinds of data, a B/U (backup) RAM 24, an I/O (input/output) circuit 25, and a bus line 26 for connecting these parts. An output signal from the ECU 20 is input to an actuator 35 located on the headlight 30 side, thereby adjusting the headlight optical axis direction 30.

Figure 2:
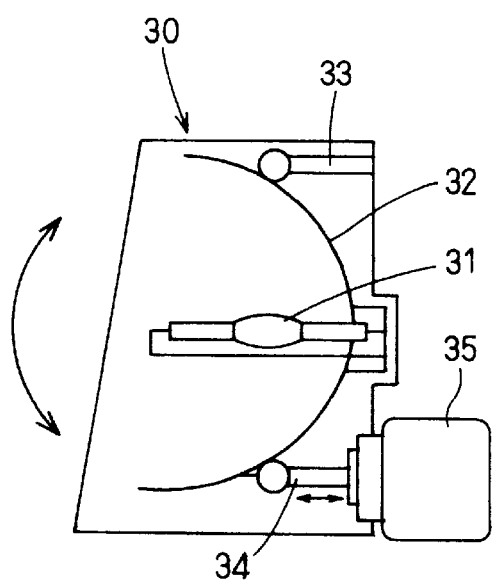
FIG. 2 is a cross-sectional view of a headlight according to the present invention.

In FIG. 2, the headlight 30 is comprised chiefly of a lamp 31, a reflector 32 securing the lamp 31, a support section 33 which supports the reflector 32 swingable in the directions of the arrows, another movable part 34 which is movable while supporting the reflector 32, and the actuator 35 such as a step motor for driving the movable part 34 back and forth in the directions of the arrows. The initial optical axis headlights 30 is set based on that only the driver is in the vehicle.

A specification discrimination signal for automatic discrimination of vehicle specifications at the ECU 20 may be input through communications from another ECU for instance. Also, as shown in FIG. 3, the specification discrimination signal may be changed over to four kinds from Spec 1 to Spec 4 by combining connection (Short) or disconnection (Open) according to vehicle specifications, by using two signal lines No. 1 and No. 2 for the specification discrimination signal.

Figures 3, 4:
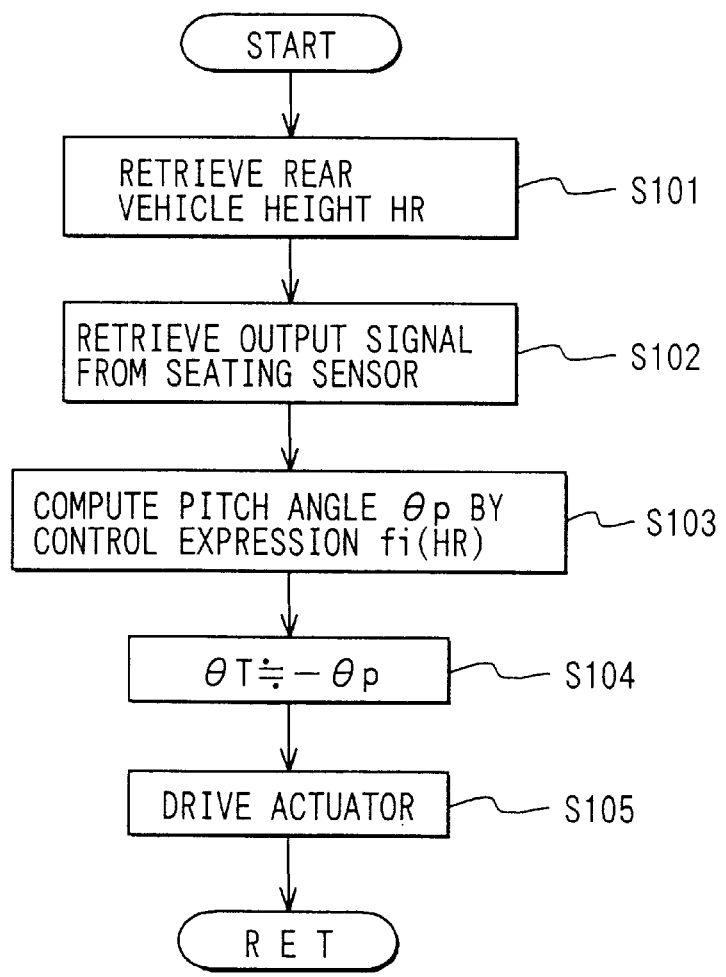
FIG. 3 is a chart showing changes corresponding to vehicle specifications using two signal lines as a specification discrimination signal according to the invention.
FIG. 4 is a control routine for an optical axis adjustment control for the present invention.

Next, FIG. 4 is a flowchart showing an optical axis adjustment control routine that is conducted by the CPU 21 of the ECU 20 under varied load conditions. The control routine is repeatedly carried out by, the CPU 21 over a predetermined timing.

Figure 5:
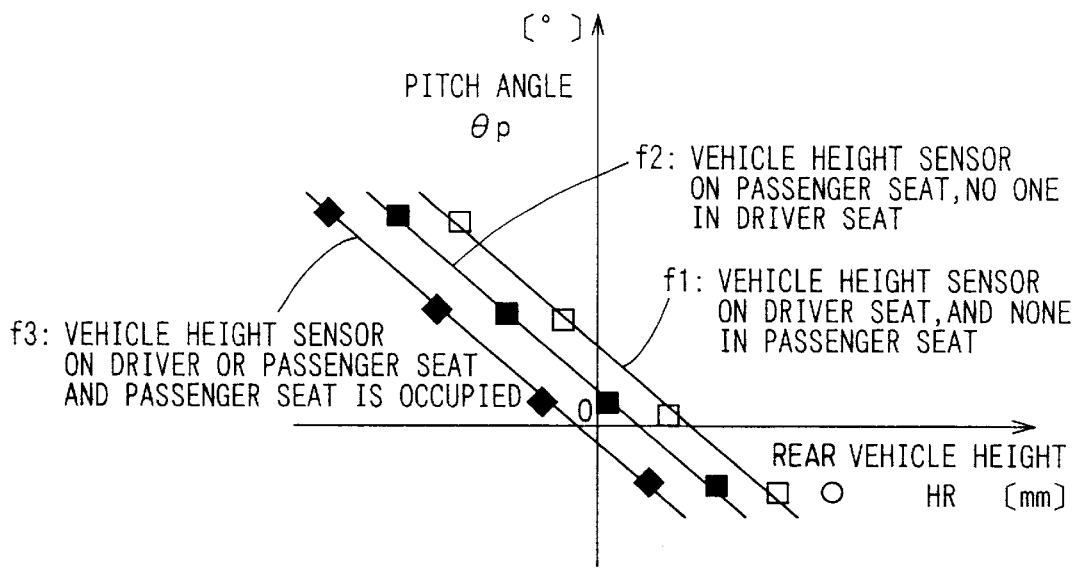
FIG. 5 is a graphical view showing a plurality of control expressions corresponding to differences in the mounting position of the vehicle height sensor according to the present invention.

FIG. 5 is a table showing various vehicle specifications, for instance, a plurality of control expressions fi (I=1, 2, 3) corresponding to different mounting positions of the vehicle height sensor 11, which are stored in the ROM 22. The control expression f1 shown in FIG. 5 is for vehicle height detection by the vehicle height sensor 11, located on the front passenger's seat side, when an output signal from a seating sensor (not shown mounted thereon to detect the seating condition of front passenger) is OFF. Specifically, this happens when the front passenger's seat is not occupied. Square white blocks on the line of control expression f1 indicate measured values of a pitch angle $\theta p[°]$ (the inclination angle with respect to a preset reference plane in the longitudinal direction of the vehicle) corresponding to the following load conditions. These conditions include the occupant's seating condition being, in order of decreasing rear vehicle height HR (mm), one occupant only in the driver's seat; one in either the driver's seat or rear seat; one in the driver's seat and two in the rear seat; and one in the driver's seat and three in the rear seat.

Furthermore, the control expression f2 shown in FIG. 5 corresponds to the inclination angle when no occupant is in the front passenger's seat when the vehicle height sensor 11 is mounted on the driver's seat side and the output signal from the seating sensor is OFF. Square black boxes on the control expression f2 line indicate measured values of a pitch angle $\theta p[°]$ corresponding to the following load conditions. They include the occupant's seating condition, in order of decreasing rear vehicle height HR (mm), is one occupant only in the driver's seat; one in the driver's seat or the front passenger's seat; one in the driver's seat and two in the rear seat; and one in the driver's seat and three in the rear seat.

Furthermore, the control expression f3 shown in FIG. 5 corresponds to a load condition with the front passenger's seat occupied where the vehicle height sensor 11 is mounted on the driver's or front passenger's seat side and the output signal from the seating sensor is ON. Rhombic black marks shown in the control expression f3 indicate measured values of the pitch angle $\theta p[°]$ corresponding to loaded conditions as follows. These include the occupant's seating condition being, in order of decreasing rear vehicle height HR (mm), one occupant in the driver's seat and the front passenger's seat; one in the driver's seat, the front passenger's seat and the rear seat; one in the driver's seat, one in the front passenger's seat, and two in the rear seat; and one in the driver's seat, one in the front passenger's seat, and three in the rear seat (all seats are occupied). Furthermore, round white marks for the rear vehicle height HR (mm) indicate the pitch angle $\theta p[°]$ when the vehicle is empty.

When the control routine of FIG. 4 is carried out, any one of the control expressions fi (I=1, 2, 3) in the table in FIG. 5 is predetermined according to the specification discrimination signal input in relation to the current vehicle's specifications. In the present embodiment, when the vehicle height sensor 11 is located on the front passenger's seat side, the control expressions f1 to f3 are selected according to the specification discrimination signal. When the vehicle height sensor 11 is located on the driver's seat side, the control expressions f2 and f3 have been selected according to the specification discrimination signal.

In FIG. 4, at Step S101, the rear vehicle height HR fed from the vehicle height sensor 11 is read in. Then, at Step S102, an output signal from the 'seating sensor is read in. Subsequently at Step S103, the pitch angle $\theta p$ is computed by the control expression fi (HR) given by substituting the rear vehicle height HR, that has been read in at Step S101, into the control expression fi (I=1, 2, 3) shown in FIG. 5 corresponding to the output signal ON/OFF from the seating sensor read in at Step S102.

Next, at Step S104, a target optical axis adjusting angle $\theta T$ ($\approx -\theta p$) at which drivers of on-coming cars will not be blinded is computed with respect to the pitch angle $\theta p$ computed at Step S103. Then, at Step 105, the actuator 35 is driven based on the target optical axis adjusting angle $\theta T$ computed at Step S104, thus completing the control routine.

The automatic headlight aiming device for a vehicle according to the present embodiment includes an inclination information detecting means which consists of the vehicle height sensor 11 for detecting the rear vehicle height HR from the vehicle height displacement as the vehicle inclination information. The device also has a control constant setting means for setting (with the CPU 21) the control expression fi (=1, 2, 3) by which the pitch angle $\theta p$ is computed from the rear vehicle height HR as an inherent control constant with respect to vehicle specifications based on a specification discrimination signal which expresses a difference in vehicle specifications. The device also has an inclination angle computing means for computing (with the CPU 21) the pitch angle θp corresponding to the inclination angle of the optical axis of the headlights from the horizontal plane by using the control expression fi set by the control constant setting means based on an output from the inclination information detecting means. The device also has an optical axis adjusting means including the CPU 21 for adjusting the direction of the optical axis of the headlights 30 by the target optical axis adjusting angle θT based on the pitch angle θp computed by the inclination angle computing means, the actuator 35, etc.

Therefore, the rear vehicle height HR is detected by the vehicle height sensor 11 as vehicle inclination information by the CPU 21. Based on the rear vehicle height HR, the pitch angle θp corresponding to the inclination angle of the headlight optical axis direction 30 from the horizontal plane is computed with the control expression fi (i=1, 2, 3) as an inherent control constant corresponding to vehicle specifications preset by the specification discrimination signal. Then, the headlight optical axis direction 30 is adjusted with reference to the pitch angle θp. Since the control constant in the ECU 20 is set with respect to vehicle specifications, a common ECU 20 can be used despite varied vehicle specifications.

In an automatic headlight aiming device for a vehicle of the present embodiment, the control expression fi (i=1, 2, 3) as the control constant based on the specification discrimination signal is set, only once after installing on the vehicle, by the control constant setting means through the CPU 21 of the ECU 20. Therefore, after the ECU 20 is installed corresponding to vehicle specifications and the control constant in the ECU 20 is once set, the control constant will never be improperly set by noise. The vehicle specifications therefore are reliably combined with the ECU 20.

When the above-described control routine is carried out, the output signal from the seating sensor will frequently vary with change in the occupant's seating posture. In this case, if the control expressions fi shown above in FIG. 5 are frequently changed, the computed pitch angle θp will vary largely albeit the rear vehicle height HR has been subjected to no change. Consequently, the optical axis direction of vehicle headlights 30 will present, an unstable movement of the headlight optical axis direction.

To overcome these drawbacks, no change is made in the occupant's seating condition during vehicle driving. Also, any change in the output signal supplied from the seating sensor is ignored. This avoids adjustment control likely to frequently and substantially change over the headlight optical axis direction 30.

Figure 6:
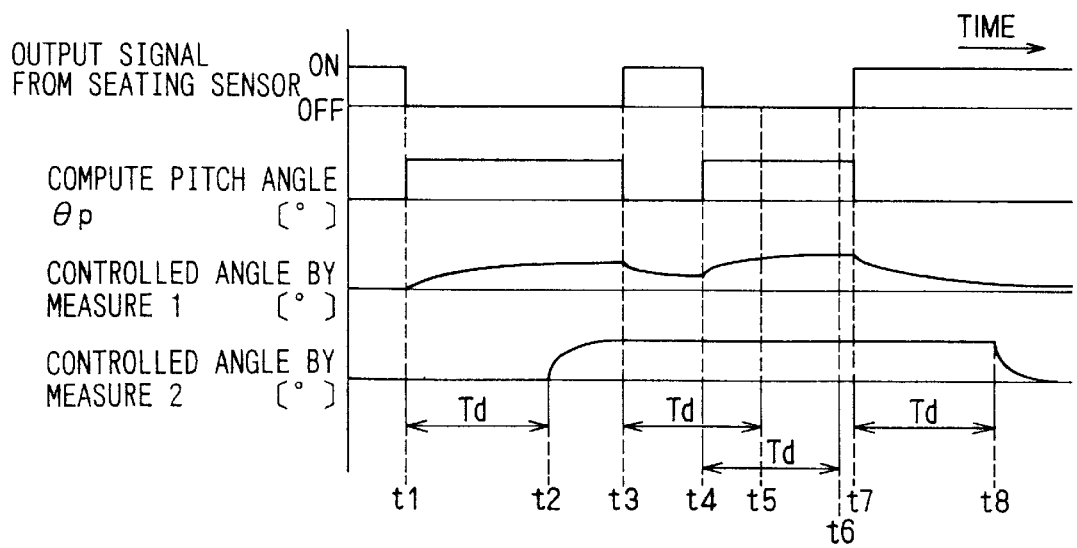
FIG. 6 is a time chart showing a transition state of various signals in the present invention.

Next, the adjustment control of the headlight optical axis direction 30 during stoppage of the vehicle will be explained with reference to the time chart of FIG. 6. As shown in FIG. 6, the output signal from the seating sensor is OFF from time t1 to t3 and from t4 to t7. It is ON before time t1, from time t3 to t4, and after time t7. The pitch angle θp[°] is computed according to the output signal supplied from the seating sensor. As the control angle [°] of the headlight optical axis direction 30 indicated at Measure 1, the pitch angle θp computed according to the output signal from the seating sensor is filtered for smoothing during an ignore time constant, such as several to 10 seconds, which can be disregarded if the headlight optical axis direction 30 is controlled. Thus large and frequent changes are eliminated.

For the control angle [°] of the headlight optical axis direction 30 indicated at Measure 2, there is provided a fixed length of decision holding time Td (seconds) from when the output signal from the seating sensor is changed. This prevents frequent changeover of the headlight optical axis direction 30. To prevent an abrupt change in the optical axis direction during changeover, a shorter filter time than in Measure 1 is used. Therefore, since the decision holding time Td is set corresponding to a change of the output signal from the seating sensor during t1, the control angle of the headlight optical axis direction 30 is gradually changed after waiting until time t2. The output signal from the seating sensor is once changed over from OFF to ON from time t3 to time t4. Since this change takes place within the range of the decision holding time Td (time t3 to time t5), the control angle will not be affected. Then, after the changeover of the output signal fed from the seating sensor from OFF to ON at time t7 and the lapse of the decision holding time Td (time t7 to time t8), the headlight optical axis control angle is gradually changed.

The automatic headlight aiming device for a vehicle according to the present embodiment comprises an inclination information detecting means which consists of the vehicle height sensor 11 for detecting the rear vehicle height HR from the vehicle height displacement as vehicle inclination information, an inclination angle computing means for computing by the CPU 21 of the ECU 20, the pitch angle θp corresponding to the inclination angle of the optical axis of the headlights from the horizontal plane based on an output from the inclination information detecting means, an optical axis adjusting means including the CPU 21 of the ECU 20 for adjusting the headlight optical axis direction 30 by the target optical axis adjusting angle θT based on the pitch angle θp computed by the inclination angle computing means, the actuator 35, etc., and a seating condition detecting means which consist of a seating sensor (not shown) for detecting the occupant's seating condition in the vehicle. The optical axis adjusting means alters the response of adjustment of the headlight optical axis direction 30 according detection supplied from the seating sensor, or delays adjustment of the headlight optical axis direction 30 for the decision holding time Td.

Therefore, headlights 30 optical axis adjustment is performed based on pitch angle θp corresponding to the headlights optical axis inclination angle in relation to the horizontal plane, based on the rear vehicle height HR detected by the vehicle height sensor 11. At this time, the response of optical axis adjustment of the headlights 30 is changed according to the detection fed from the seating sensor, and optical axis adjustment of the headlights 30 is delayed for a predetermined time. Therefore, substantial change and unstable movement of the headlight optical axis direction 30 is prevented during frequent variation of the seating sensor detection.

In the automatic headlight aiming device for a vehicle according to the present embodiment, the optical axis adjusting means which consists of the CPU 21 of the ECU 20, the actuator 35, etc. fixes the detection supplied from the seating sensor. Adjustment causing an unstable changeover of the headlight optical axis direction 30 is prevented if the seating sensor is ignored presuming that the occupant's seating condition will not vary during vehicle driving.

While the above-described embodiments refer to examples of usage of the present invention, it is understood that the present invention may be applied to other usage, modifications and variations of the same, and is not limited to the disclosure provided herein.

What is claimed is:

1. An automatic headlight aiming device for a vehicle, comprising:

an information detecting means for detecting vehicle inclination information;

a control constant setting means for setting inherent control constants according to vehicle specifications based on a specification discrimination signal indicating a difference in vehicle specifications;

an inclination angle computing means for computing an inclination angle of a headlight optical axis of the vehicle with respect to a horizontal plane by using the control constants based on an output from the inclination information detecting means; and an inclination angle computing means for adjusting the optical axis of the headlights based on the inclination angle computed by the inclination angle computing means.

2. An automatic headlight aiming device for a vehicle according to claim 1, wherein the control constant setting means sets the control constants based on the specification discrimination signal only once after installation of said control constant setting means to the vehicle.

3. An automatic headlight aiming device for a vehicle, comprising:

an inclination information detecting means for detecting vehicle inclination information;

an inclination computing means for computing an inclination angle of a headlight optical axis of the vehicle with respect to a horizontal plane in based on an output from the inclination information detecting means;

an inclination angle computing, means for adjusting the headlight optical axis direction based on the inclination angle computed by the inclination computing means; and a seating condition detecting means for detecting the driver's seating condition in the vehicle;

wherein the inclination angle computing means changes aiming response in a direction of the optical axis of headlights of the vehicle or delays optical axis adjustment for a predetermined time.

4. An automatic headlight aiming device for a vehicle according to claim 3, wherein the inclination angle computing means operates with a detection result from the seating condition detecting means fixed during driving of the vehicle.

5. An automatic headlight aiming device for a vehicle, comprising:

a height sensor that measures a vertical position of a body of said vehicle with an axle of said vehicle;

a processor responsive to a specification discrimination signal and a seating signal to calculate an inclination angle with respect to a horizontal plane, said discrimination signal providing information regarding positioning of seating sensors, said seating signal providing information regarding a seating condition of said vehicle; and a headlight movable in response to an output signal of said processor which represents said inclination angle, said headlight moving to said inclination angle in response to said output signal.

6. An automatic headlight aiming device as claimed in claim 5, wherein said processor delays adjusting said headlight for a predetermined amount of time.

7. A method for adjusting an automatic headlight on a vehicle, said method comprising the steps of:

reading a vertical position of an axle of said vehicle relative to a body of said vehicle;

calculating an inclination angle of said vehicle based on a seating condition of said vehicle and said vertical position of said axle relative to said body; and moving a headlight of said vehicle in response to said calculated inclination angle.

8. An automatic headlight aiming device as claimed in claim 5, wherein the headlight gradually changes to said inclination angle when the vehicle is stopped.

9. An automatic headlight aiming device as claimed in claim 8, wherein the headlight gradually changes to said inclination angle only when said seating signal remains unchanged for a predetermined time period.

\* \* \* \* \*